United States Patent
Tokura

(10) Patent No.: US 6,614,544 B2
(45) Date of Patent: *Sep. 2, 2003

(54) INFORMATION PROCESSING APPARATUS, INFORMATION PROCESSING METHOD, MEMORY MEDIUM STORING PROGRAM READABLE BY INFORMATION PROCESSING APPARATUS, AND PRINT CONTROL SYSTEM

(75) Inventor: Yutaka Tokura, Ebina (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/755,368

(22) Filed: Nov. 25, 1996

(65) Prior Publication Data

US 2003/0086113 A1 May 8, 2003

(30) Foreign Application Priority Data

Nov. 28, 1995 (JP) .............................. 7-331234

(51) Int. Cl.$^7$ ............................. G06F 3/12; G06F 13/00
(52) U.S. Cl. ..................................... 358/1.15; 358/1.14
(58) Field of Search ................................ 382/248, 232, 382/487, 233, 235, 239; 358/426, 429, 433, 430, 1.15, 1.16, 1.17, 1.1, 1.18; 395/114, 112, 115, 116, 117, 101; 709/232, 229; 710/33, 34, 35

(56) References Cited

U.S. PATENT DOCUMENTS

| | | | |
|---|---|---|---|
| 5,455,680 A | * 10/1995 | Shin | 358/426 |
| 5,471,563 A | 11/1995 | Dennis et al. | 395/114 |
| 5,488,365 A | * 1/1996 | Seroussi et al. | 341/51 |
| 5,577,173 A | 11/1996 | Dennis et al. | 395/116 |
| 5,638,498 A | * 6/1997 | Tyler et al. | 395/117 |
| 5,771,340 A | * 6/1998 | Nakazato et al. | 395/114 |
| 5,850,527 A | * 12/1998 | Suzuki | 395/200.77 |
| 5,900,946 A | * 5/1999 | Kunitake et al. | 358/426 |

FOREIGN PATENT DOCUMENTS

| | | | |
|---|---|---|---|
| EP | 0 575 134 A2 | 12/1993 | G06K/15/00 |
| JP | 4-342014 | 11/1992 | G06F/3/12 |
| JP | 6-87251 | 3/1994 | B41J/29/38 |
| JP | 6-171160 | 6/1994 | B41J/5/30 |
| JP | 6-195182 | 7/1994 | G06F/3/12 |
| JP | 6-292024 | 10/1994 | H04N/1/413 |
| JP | 7-98636 | 4/1995 | G06F/3/12 |
| JP | 7-274011 | 10/1995 | H04N/1/415 |

* cited by examiner

Primary Examiner—Gabriel Garcia
Assistant Examiner—Douglas Tran
(74) Attorney, Agent, or Firm—Fitzpatrick, Cella, Harper & Scinto

(57) ABSTRACT

An information processing apparatus for generating output information and transmitting the output information to an external device includes generation means for generating the output information, first compression means for compressing the output information generated by the generation means, second compression means for compressing the output information generated by the generation means, selection means for selecting the compression means for compressing the output information, and compression control means for controlling, according to a result of selection by the selection means, so as to compress the output information by said first compression means when the first compression means is selected, or to compress the output information by the second compression means when the second compression means is selected.

23 Claims, 5 Drawing Sheets

INFORMATION PROCESSING APPARATUS, INFORMATION PROCESSING METHOD, MEMORY MEDIUM STORING PROGRAM READABLE BY INFORMATION PROCESSING APPARATUS, AND PRINT CONTROL SYSTEM

BACKGROUND OF THE INVENTION

1. Field of the Invention

The present invention relates to an information processing apparatus capable of transmitting print information and image information in compressed form to a printing apparatus, a method therefor, a memory medium storing a program readable by the information processing apparatus, and a print control system.

2. Related Background Art

The conventional printing system is known, as an example, in a configuration shown in FIG. 5.

Such conventional printing control system is composed of a host computer 101 for generating printing information and image information, and a printer 102 connected to the above-mentioned host computer 101 through a predetermined interface such as Centronics interface. The printer 102 is provided with a printer controller 103 for controlling the print information and the image information transmitted from the host computer 101 and a printer engine 104 for controlling an electrophotographic process including such steps as charging, exposure, image development, image transfer, fixing and sheet transportation, and such printer engine 104 and the print controller 103 are rendered capable of mutual communication through an interface.

In such printing system, when the printer controller 103 receives image information and a print start command constituting print information from the host computer 101, such print start command and a video signal representing the image information are transmitted to the printer engine 104.

In response to the printer engine 104 controls the above-mentioned electrophotographic process and effects the printing process based on thus transmitted video signal. Also the printer controller 103 detects the status of the printer 102 through the printer engine 104 and transmits print environment information, representing such status, to the host computer 101.

However, such conventional printing system is applicable to a case where the transfer time of the image information from the host computer 101 to the printer controller 103 is shorter than that from the printer controller 103 to the printer engine 104, namely to a low-speed printer engine, but is inapplicable to a case where the transfer time of the image information from the host computer 101 to the printer controller 103 is longer than that from the printer controller 103 to the printer engine 104, namely to a high-speed printer engine. Stated differently, in consideration of the recent requirements for the higher speed, higher resolution and lower cost for the printer, the conventional printing system is restricted in the speed of the printer engine in order to provide the printing result required by the user.

In consideration of the foregoing, the present invention is to provide a print control system, an information processing apparatus and an information processing method that can ensure high-quality output even in a high-speed printer engine, without resulting in an increase in the cost.

SUMMARY OF THE INVENTION

A first invention of the present invention is featured by comprising:

generation means for generating output information;

first compression means for compressing the output information generated by the generation means;

second compression means for compressing the output information generated by the generation means;

selection means for selecting the compression means for compressing the output information; and compression control means for causing, according to a result of selection by the selection means, the first compression means to compress the output information in case the first compression means is selected, or the second compression means to compress the output information in case the second compression means is selected.

A second invention of the present invention is featured by comprising:

first expansion means for expanding the compressed output information generated by first compression means;

second expansion means for expanding the compressed output information generated by second compression means; and expansion control means for causing the first expansion means to expand the output information compressed by the first compression means, and the second expansion means to expand the output information compressed by the second compression means.

A third invention of the present invention is featured by comprising:

first compression means for compressing the output information generated by generation means;

second compression means for compressing the output information generated by the generation means;

first expansion means for expanding the compressed output information generated by the first compression means;

second expansion means for expanding the compressed output information generated by the second compression means;

selection means for selecting the compression means for compressing the output information;

compression control means for causing, according to a result of selection by the selection means, the first compression means to compress the output information in case the first compression means is selected, or the second compression means to compress the output information in case the second compression means is selected; and expansion control means for causing the first expansion means to expand the output information compressed by the first compression means, and the second expansion means to expand the output information compressed by the second compression means.

BRIEF DESCRIPTION OF THE INVENTION

DESCRIPTION OF THE PREFERRED EMBODIMENTS

Now the present invention will be clarified in detail by a preferred embodiment thereof, with reference to the attached drawings.

Figure 1:
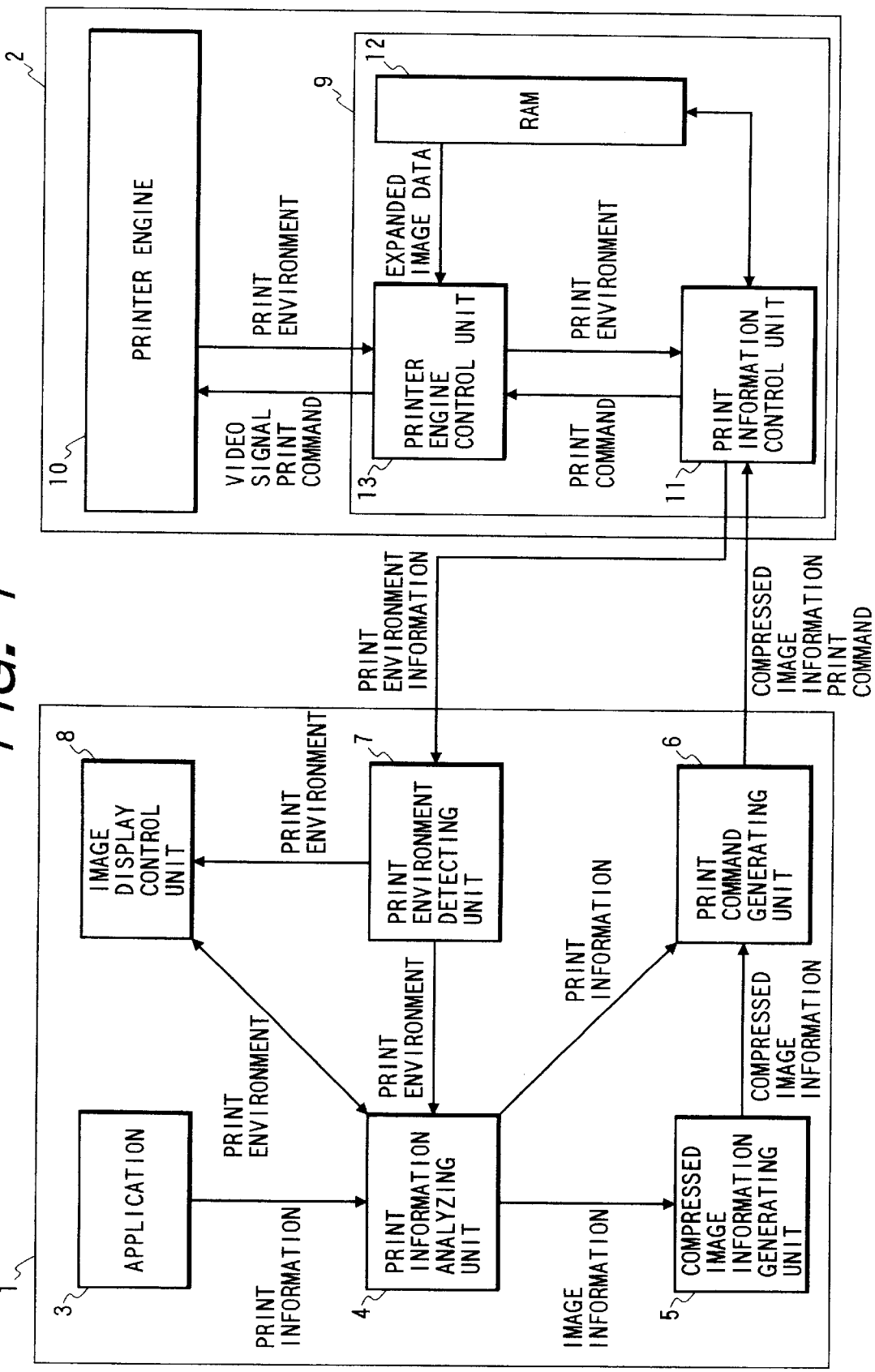
FIG. 1 is a block diagram showing the configuration of an embodiment of the print control system of the present invention.

FIG. 1 is a block diagram showing the configuration of an embodiment of the print control system of the present invention, which is composed of a host computer 1 for generating print information and image information, and a laser beam printer 2 connected with the host computer 1 through a predetermined interface such as a centronics interface.

The host computer 1 mentioned above is provided with an application process unit 3 for executing a predetermined application program, a print information analysis unit 4 for analyzing the print information transmitted from the application process unit 3 thereby generating image information, a compressed image information generation unit 5 for generating compressed image information from the image information generated in the print information analysis unit 4, a print command generation unit 6 for receiving the compressed image information and a print command from the print information analysis unit 4, a print environment detection unit 7 for detecting the print environment information transmitted from the laser beam printer 2, and an image display control unit 8 for receiving the print environment detected by the print environment detection unit 7.

The host computer 1 incorporates a CPU, an RAM, an ROM etc., and the above-mentioned units 2 to 8 are operated by the CPU according to a program stored in the ROM, utilizing the RAM as a work memory.

The above-mentioned program may also be supplied to the RAM from an external memory medium such as a floppy disk and the CPU may function according to such program stored in the RAM.

The laser beam printer 2 is composed of a printer controller 9 for exchanging various information with the host computer 1, and a printer engine 10 constituting a printing process unit. More specifically, the printer engine 10 is composed of already known components for executing an electrophotographic process, such as a transport mechanism for the recording medium, a semiconductor laser unit, a photosensitive drum, an image developing unit, a fixing unit, a cleaning unit, a separation unit etc.

The printer controller 9 mentioned above is provided with a print information control unit 11 for receiving the compressed image information etc. from the host computer 1 and transmitting the print environment information of the laser beam printer 2 to the host computer 1, an RAM 12 for storing expanded image information generated from the compressed image information, and a printer engine control unit 13 for controlling the printer engine 13 according to the print information control unit 11 and based on the expanded image information stored in the RAM 12. The above-mentioned units 11 to 13 are operated by the CPU in the printer controller 9, based on a program stored in the ROM therein.

In the above-mentioned print control system, when the host computer 1 is started up, the print information analysis unit 4, the print command generation unit 6 and the print environment detection unit 7 are simultaneously started up. Then, when the user executes a printing process during the use of an application, the application process unit 3 sends the print information to the print information analysis unit 4, which in response generates the image information and the print command from the print information and sends these image information and print command respectively to the compressed image information generation unit 5 and the print command generation unit 6. Then the compressed image information generation unit 5 generates the compressed image information after converting the image information into dot information, and sends such compressed image information to the laser beam printer 2 in synchronization with a print start command (print command) of the print command generation unit 6.

The laser beam printer 2 receives the print start command transmitted from the host computer 1, and transmits it to the printer engine 10 through the print information control unit 11 and the printer engine control unit 13 incorporated in the printer controller 9. The print information control unit 11 stores the received compressed image information in the RAM 12 and expands the same according to information of the compressing system to be explained later, and stores thus expanded image information in the RAM 12. Then, when the printer engine control unit 13 detects a status, indicating the indicating the enabled state for transmission of information, from the printer engine 10, it transfers the expanded image information stored in the RAM 12 to the printer engine 10 through the printer engine control unit 13, thereby executing the predetermined printing process.

The printing environment of the printer engine 10 is detected by the printer engine control unit 13 and transferred to the print information control unit 11, which transfers the print environment information, representing such print environment, to the print environment detection unit 7 of the host computer. Upon detection of such print environment information, the print environment detection unit 7 informs the print information analysis unit 4 and the image display control unit 8 of such print environment, thereby effecting predetermined control.

Figure 2:
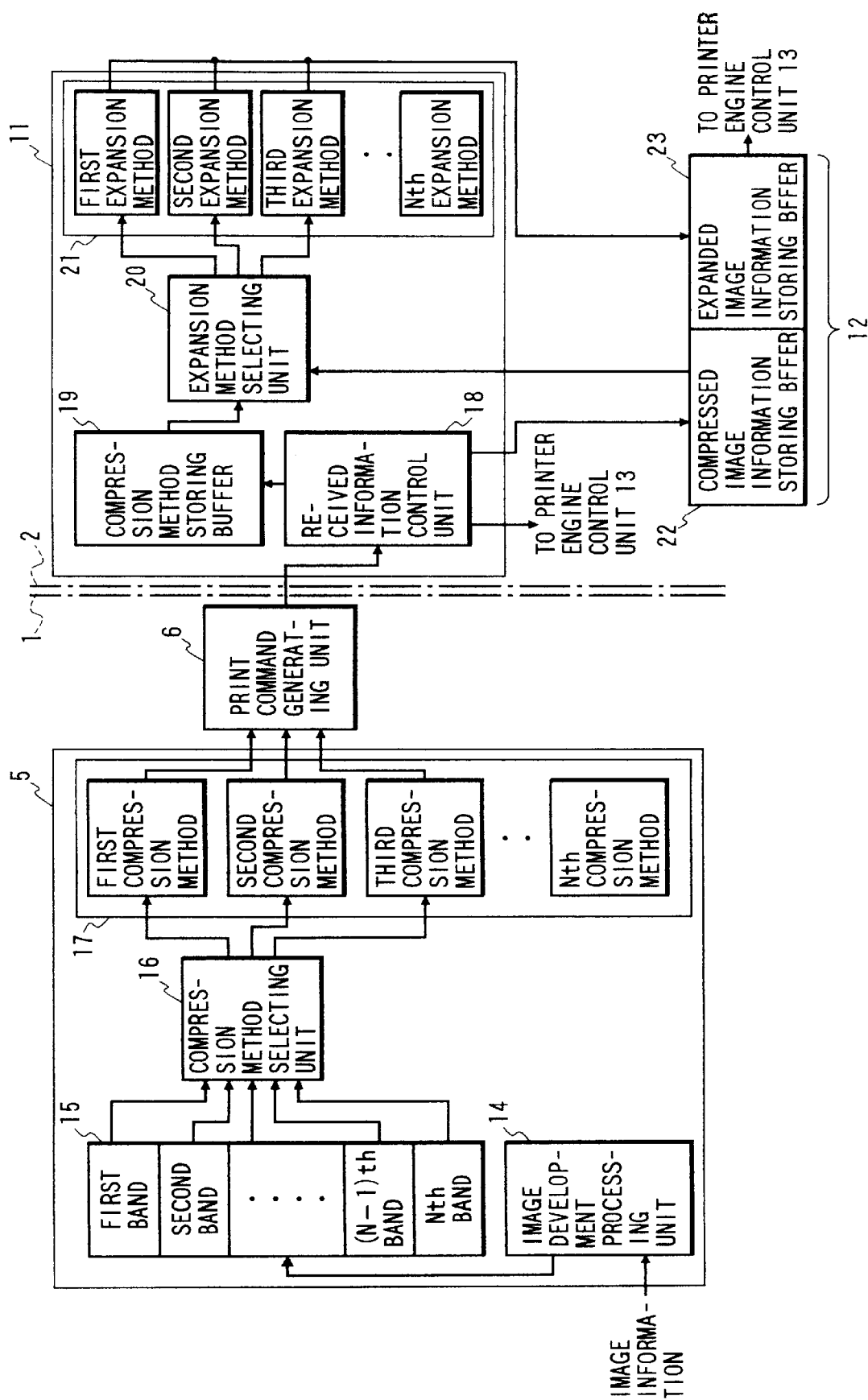
FIG. 2 is a block diagram showing the details of a principal part of FIG. 1.

The compressed image information generation unit 5 mentioned above is provided, as shown in FIG. 2, with an image development process unit 14 for developing, into bands, the image information transmitted from the print information analysis unit 4, a band buffer 15 for storing thus developed image information of a page in a divided state in plural bands, a compression method selection unit 16 for selecting a specified compression method from plural compression methods, in order to convert the image information stored in the band buffer 15 into compressed image information, and a compression process unit 17 for compressing the image information by executing the specified compression method selected by the compression method selection unit 16. Thus, when the image information from the print information analysis unit 4 is supplied to the image development process unit 14, it generates the image information of each page, which is then stored in the band buffer 15 in a divided state into plural portions (first band, second band, . . . , N-th band). The band buffer 15 need not necessarily have a capacity corresponding to the number of bands of the transmitted image information of each page. It is also desirable to employ a band buffer 15 of a memory capacity less than the above-mentioned number of bands and to use such band buffer in a cyclic manner.

Then the compression method selection unit 16 selects and determines the compression method to be used for compressing the image information stored in the band buffer 15. The compression process unit 17 stores plural compression methods (first compression method, second compression method, . . . , N-th compression method), among which a specified compression method is selected by the compression method selection unit 16. More specifically, the compression method selection unit 16 is in advance given an order of selection for the plural compression methods provided in the compression process unit 17, and selects the compression methods, for example, in the order of first method, second method, . . . In such selection, it is also desirable to form such order of selection according to the content of the image information, for example to start selection from the second compression method in case of image information and from the third compression method in case of character information. Thus the compression process unit 17 generates the compressed image information by compressing the image information according to the selected compression method, and transfers 1-byte information indicating the selected compression method, followed by the compressed image information, to the laser beam printer 2 through the print command generation unit 6.

The print information control unit 11 of the laser beam printer 2 is provided with a received information control unit 18 for receiving the compressed image information from the host computer 1, a compression method storage buffer 19 for storing the information of the compression method, positioned in front of the above-mentioned compressed image information, an expansion method selection unit 20 for selecting a specified expansion method from plural expansion methods (first expansion method, second expansion method, . . . , N-th expansion method) according to the content stored in the compression method storage buffer 19, and an expansion process unit 21 for executing an expansion process utilizing the specified expansion method selected by the expansion method selection unit 20. More specifically, the expansion process unit 21 is provided therein with plural expansion methods mentioned above, and the expansion method selection unit 20 selects a specified expansion method from such plural methods according to the information of the compression method stored in the compression method storage buffer 19. The first, second, . . . , N-th expansion methods of the expansion process unit 21 are correlated in advance with the first, second, . . . , N-th compression methods of the compression process unit 17. Thus, based on the information of the compression method attached in front of the compressed image information, the expansion method selection unit 20 selects the expansion methods, and the expansion process unit 21 executes the expansion process on the compressed image information.

The RAM 12 is provided with a compressed image information storage buffer 22 for storing the compressed image information entered into the received information control unit 18, and an expanded image information storage buffer 23 for storing the expanded image information expanded in the expansion process unit 21.

The print information control unit 11 of the above-explained configuration causes, among the compressed image information transmitted together with the information of the compression method from the host computer 1, the received information control unit 18 to transmit the above-mentioned information of the compression method to the compression method storage buffer 19, and also causes the received information control unit 18 to transmit the compressed image information, other than the above-mentioned information of the compression method, to the compressed image information storage buffer 22, whereby such information are respectively stored in the compression method storage buffer 19 and the compressed image information storage buffer 22. After the reception of the compressed image information of a band relating to the above-mentioned information of the compression method, the expansion method selection unit 20 selects an expansion method from the information (information on the compression method) stored in the compression method storage buffer 19 and the compressed image information, stored in the compressed image information storage buffer 22 of the RAM 12, is transmitted to the expansion process unit 21 through the expansion method selection unit 20. Thus the expansion process unit 21 expands the compressed image information according to the expansion method selected and specified by the expansion method selection unit 20, thereby generating the expanded image information which is transmitted to the expanded image information storage buffer 23.

Figure 3:
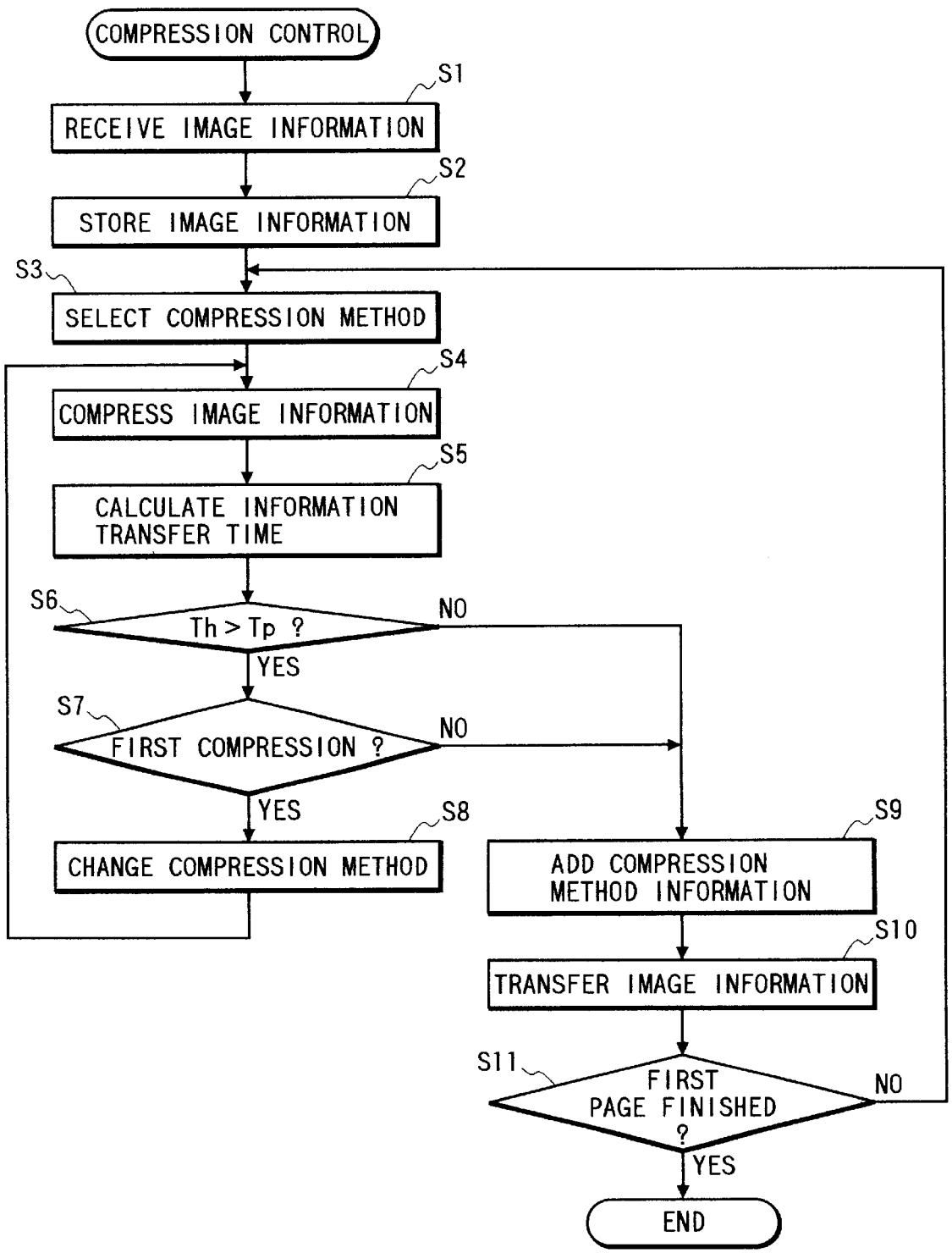
FIG. 3 is a flow chart showing the compression control sequence.

FIG. 3 is a flow chart showing the sequence of compression control executed by the host computer 1. The host computer knows in advance the transmission time Tp (video signal rate) for the expanded image information from the printer controller 9 in the laser beam printer 2 to the printer engine 10. In the following description the printer is assumed to be a high-speed printer with a short transmission time Tp for the expanded image information, and, for the purpose of brevity, it is assumed that the compression method can be altered twice at maximum.

In a step S1, the image development process unit 14 of the compressed image information generation unit 5 receives the image information transmitted from the print information analysis unit 4. Then the image development process unit 14 divides the image information into bands, then stores thus divided image information in the band buffer 15 and initiates the process from the first band (step S2). In a subsequent step S3, the compression method selection unit 16 selects, for the image information of a specified band, a specified compression method from the plural compression methods, and the compression process unit 17 compressers the image information, utilizing the specified compression method thus selected (step S4).

Then the print information analysis unit 4 calculates the transfer time Th of the compressed image information from the host computer 1 to the laser beam printer 2, and the transmission time Tp of the expanded image information from the printer controller 9 to the printer engine 10 (step S5). More specifically, the transfer time Th is calculated from the image information of a band stored in the band buffer 15, and the transmission time Tp is calculated from the expanded image information of a band. It is also desirable to increase the transmission time Tp of the expanded image information, in consideration of the expansion time required by the compressed image information.

A next step S6 discriminates whether the transfer time Th of the compressed image information is longer than the transmission time Tp of the expanded image information. If the former is longer, there is discriminated whether the compression of the image information is conducted for the first time in the same band (step S7), and, if so, the compression method is altered and the sequence returns to the step S4. For example the compression method is altered from the first one to the second one, and the sequence returns to the step S4 to compress the image information again with thus altered compression method. If the compression rate is lower than that of the previous compression method, there is adopted the information obtained by the previous compression method, but, if the compression rate is higher, there is adopted the information obtained by the present compression method.

If the step S6 identifies that the transfer time Th of the compressed image information is shorter than the transmission time Tp of the expanded image information, or if the step S7 identifies that the compression of the image information is executed for the second time for the same band, the 1-byte information of the compression method is attached in front of the compressed image information (step S9). Subsequently the print command generation unit 6 transfers the compressed image information with the attached information of the compression method to the laser beam printer 2 in synchronization with the print start command transmitted from the print information analysis unit 4 (step S10), whereby the process is terminated. Such process is executed for all the bands until the image information of a page is processed. If the image information of a page has not yet been processed, the sequence returns to the step S3 to process the next band (step S11).

Figure 4:
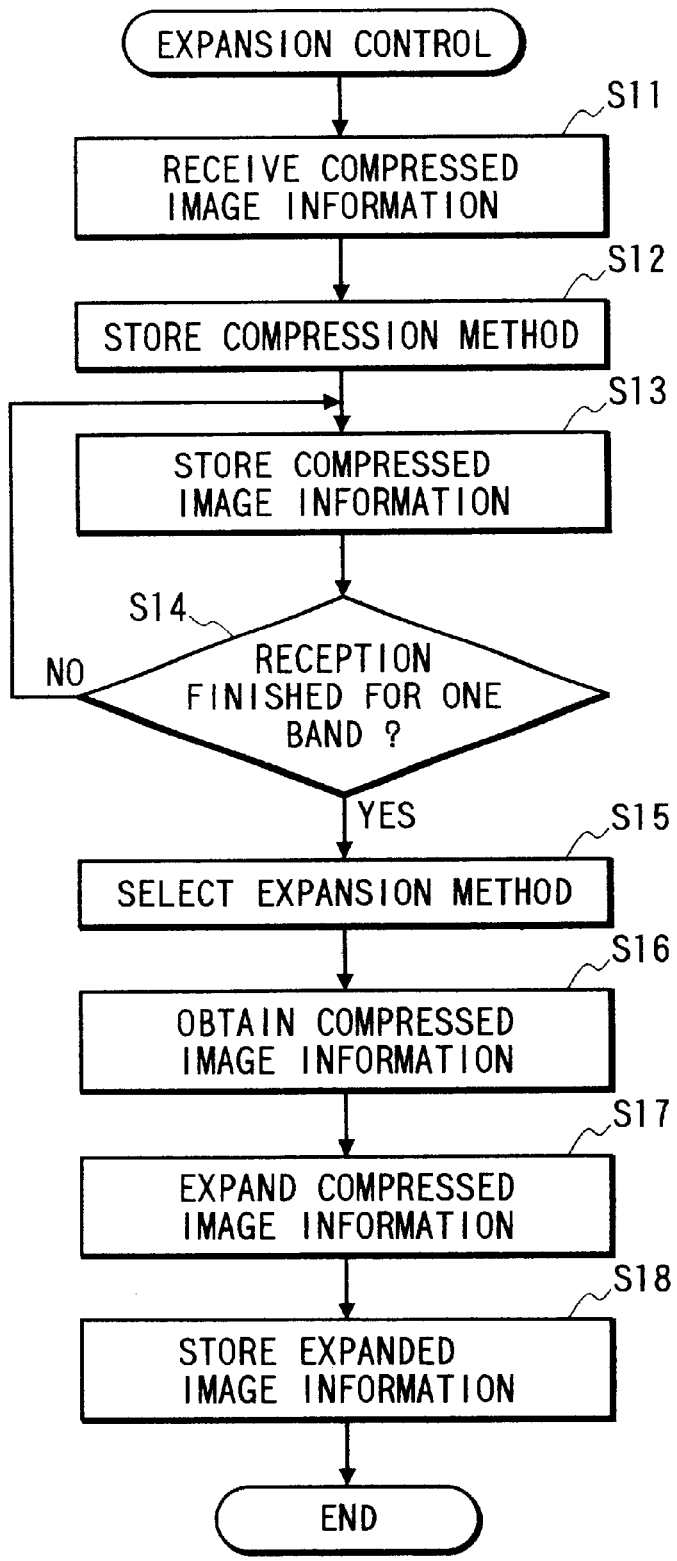
FIG. 4 is a flow chart showing the expansion control sequence.
Figure 5:
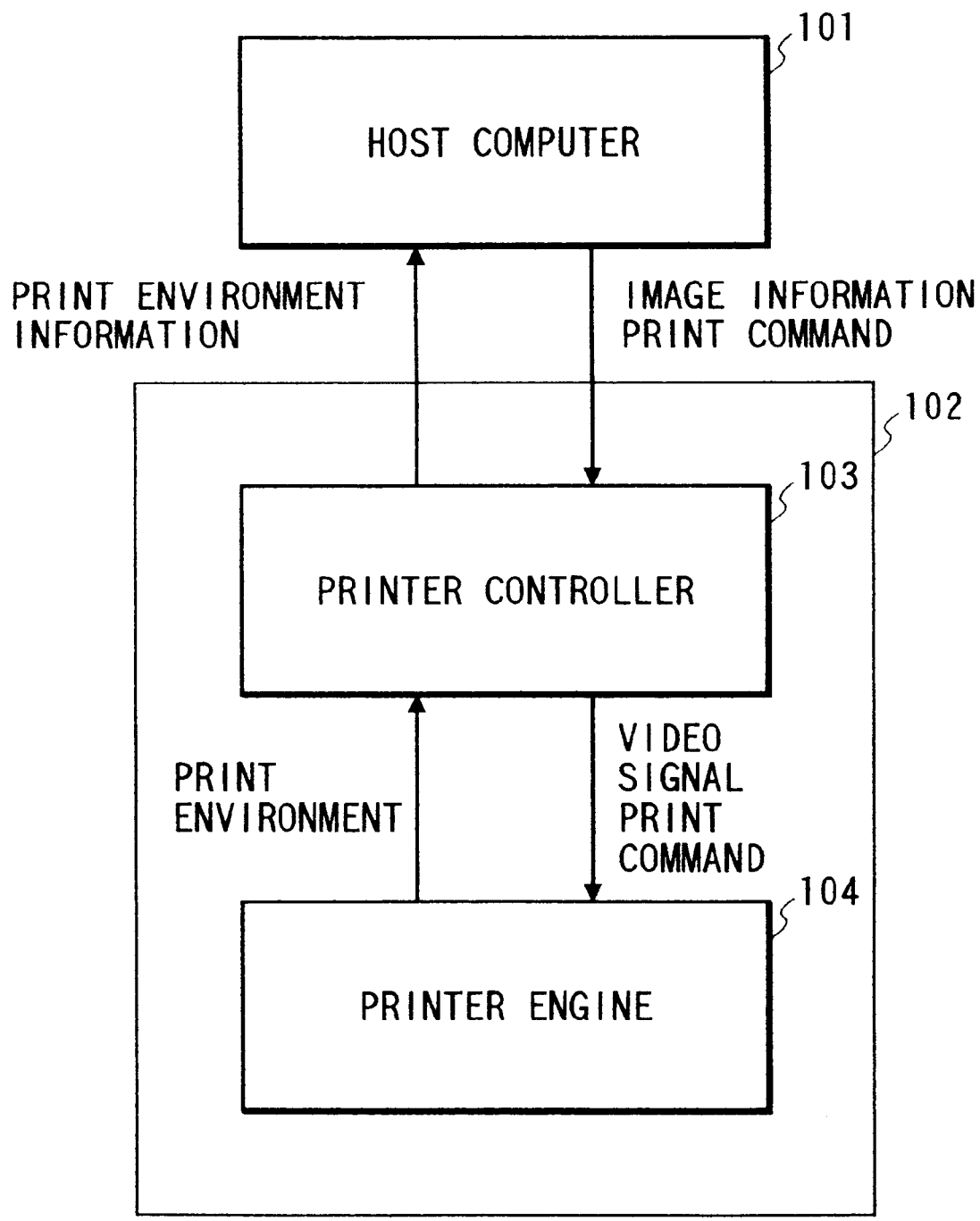
FIG. 5 is a schematic block diagram of a conventional printing system.

FIG. 4 is a flow chart showing the sequence of expansion control executed by the print information control unit 11.

The received information control unit 18 of the print information control unit 11 receives the compressed image information, with the attached information of the compression method, from the host computer 1 (step S11). Within the compressed image information thus received, the leading byte, corresponding to the attached information of the compression method, is stored by the print information control unit 11 in the compression method storage buffer 19 (step S12). Then the print information control unit 11 stores the compressed image information, other than the above-mentioned information of the compression method, in the compressed image information storage buffer 22 of the RAM 12 (step S13), and there is discriminated whether the reception of the compressed image information of a band has been completed (step S14). If not, the sequence returns to the step S13 to continue the reception of information, but, if completed, the expansion method selection unit 20 selects a specified expansion method based on the information of the compression method stored in the compression method storage buffer 19 (step S15). Then the compressed image information stored in the compressed image information storage buffer 22 is transmitted to the expansion process unit 21 through the expansion method selection unit 20 (step S16). The expansion process unit 21 expands the compressed image information, utilizing the specified expansion method thus selected (step S17). Then the expanded image information is stored in the expanded image information storage buffer 23 of the RAM 12 (step S18), and the process is terminated. If the data of a page has not yet been processed, the sequence returns to the step S11 to process the next band.

The above-explained process is executed on the compressed image information of a page, namely on all the bands of the compressed image information including the attached information of the compression method.

It is to be noted that the present invention is not limited to the above-explained embodiment. In the foregoing embodiment, the selection of the compression method is executed only twice, namely with only one re-compression, in order to match the high-speed printer engine, but it is also possible to vary the number of selection of the compression method according to the speed of the printer engine 10. More specifically, a same process routine may be employed for the low-speed printer engine and the high-speed printer engine, by varying, in the step S7 in FIG. 3, the number of compressions according to the kind of the printer engine 10.

Also in the foregoing embodiment the information obtained by the previous compression is adopted if the amount of information obtained in the re-compression is larger than that obtained in the previous compression, but it is also possible to adopt the information obtained by the re-compression if the adoption of the information of the previous compression is not possible for example because of limitation in the memory capacity or in the time.

It is also desirable to switch the compression method in the compressed image information generation unit 5, by attaching the information of the application process unit 3 to the image information transmitted from the print information analysis unit 4.

As detailedly explained in the foregoing, the present invention realizes a print control system capable of ensuring high-quality output without an increase in the cost, even in using a high-speed printer engine.

What is claimed is:

1. An information processing apparatus which transmits information to a print control apparatus which controls a print unit, said information processing apparatus comprising:

a generator for analyzing print information output from an application and generating a plurality of bands of image information from the print information, wherein one page of image information is divided into the plurality of bands of image information;

an estimator for estimating a transmission time required to transmit compressed image information from said information processing apparatus to the print control apparatus;

a selector for selecting one of a plurality of compression methods based on the transmission time estimated by said estimator;

a compressor for compressing each of the plurality of bands of image information in the compression method selected by said selector; and a transmitter for transmitting each of the plurality of bands of compressed image information to the print control apparatus.

2. An information processing apparatus according to claim 1, wherein said compressor compresses the image information band by band and said selector selects the one compression method band by band.

3. An information processing apparatus according to claim 1, wherein said selector selects the one compression method by comparing the transmission time with a processing time which starts when the compressed image information is received by the print control apparatus and ends when the compressed image information is output to the print unit.

4. An information processing apparatus according to claim 3, wherein the processing time includes an expansion time of the compressed image information.

5. An information processing apparatus according to claim 1, further comprising an adder for adding information indicating the selected one compression method to the compressed image information.

6. An information processing apparatus according to claim 1, wherein said selector provides the plurality of compression methods with respective priorities for selection, in consideration of context of the information to be transmitted to the print control apparatus.

7. An information processing apparatus according to claim 1, wherein said selector selects the one compression method based on a compression ratio of the image information which would be compressed in the selected one compression method.

8. A method carried out in an information processing apparatus which transmits information to a print control apparatus which controls a print unit, comprising the steps of:

analyzing print information output from an application and generating a plurality of bands of image information from the print information, wherein one page of image information is divided into the plurality of bands of image information;

estimating a transmission time required to transmit compressed image information from said information processing apparatus to the print control apparatus;

selecting one of a plurality of compression methods based on the transmission time estimated in said estimating step;

compressing each of the plurality of bands of image information in the compression method selected in said selecting step; and transmitting each of the plurality of bands of compressed image information to the print control apparatus.

9. A method according to claim 8, wherein said compressing step compresses the information band by band and said selecting step selects the one compression method band by band.

10. A method according to claim 8, wherein said selecting step selects the one compression method by comparing the transmission time with a processing time which starts when the compressed image information is received by the print control apparatus and ends when the compressed image information is output to the print unit.

11. A method according to claim 10, wherein the processing time includes an expansion time of the compressed image information.

12. A method according to claim 8, further comprising the step of adding information indicating the selected one compression method to the compressed image information.

13. A method according to claim 8, wherein said selecting step provides the plurality of compression methods with respective priorities for selection, in consideration of a context of the information to be transmitted to the print control apparatus.

14. A method according to claim 8, wherein said selecting step selects the one compression method based on a compression ratio of the image information which would be compressed in the selected one compression method.

15. A print system comprising a print control apparatus and an information processing apparatus which transmits information to said print control apparatus via an interface,
wherein said information processing apparatus comprises:
a generator for analyzing print information output from an application and generating a plurality of bands of image information from the print information;
a compressor for compressing each of the plurality of bands of image information generated by said generator; and
a transmitter for transmitting each of the plurality of bands of image information compressed by said compressor to said print control apparatus, and
wherein said print control apparatus comprises:
a print controller for decompressing one of the plurality of bands of image information transmitted by said transmitter, and outputting the one band of decompressed image information to a print unit,
wherein before said print controller has outputted one band of decompressed image information, said transmitter transmits another band of image information to said print control apparatus.

16. A print system according to claim 15, wherein said generator divides one page of image information into the plurality of bands.

17. A print system according to claim 15, further comprising a selector for selecting one of a plurality of compression methods, wherein said compressor compresses each of the plurality of bands of image information in the one compression method selected by said selector.

18. A print system according to claim 15, further comprising a selector for selecting one of a plurality of compression methods, wherein said transmitter transmits each of the plurality of bands of compressed image information with information added thereto indicating the one compression method selected by said selector to said print control apparatus.

19. A method carried out in a print system comprising a print control apparatus and an information processing apparatus which transmits information to the print control apparatus via an interface, said method comprising:
a step of analyzing print information output from an application and generating a plurality of bands of image information from the print information in the print control apparatus;
a compression step of compressing each of the plurality of bands of image information generated in said generating step, in the print control apparatus;
a transmitting step of transmitting each of the plurality of bands of image information compressed in said compression step from the information processing apparatus to said print control apparatus;
a print controlling step for decompressing one of the plurality of bands of image information transmitted in said transmitting step, and outputting the one band of decompressed image information to a print unit,
wherein before said print controlling step has outputted one band of decompressed image information, said transmitting step transmits another band of image information to said print control apparatus.

20. A method according to claim 19, wherein said generating step divides one page of image information into the plurality of bands.

21. A method according to claim 19, further comprising a selection step of selecting one of a plurality of compression methods, wherein said compression step compresses each of the plurality of bands of image information in the one compression method selected in said selection step.

22. A method according to claim 19, further comprising a selection step of selecting one of a plurality of compression methods, wherein said transmitting step transmits each of the plurality of bands of compressed image information with information added thereto indicating the one compression method selected in said selection step to the print control apparatus.

23. A computer-readable memory medium which stores a computer program for controlling an information processing apparatus which transmits image information to a print control apparatus, the program controlling the information processing apparatus to perform:
a step of analyzing print information output from an application and generating a plurality of bands of image information from the print information, wherein one page of image information is divided into the plurality of bands of image information;
an estimating step of estimating a transmission time required to transmit compressed image information from said information processing apparatus to the print control apparatus;
a selecting step of selecting one of a plurality of compression methods based on the transmission time estimated in said estimating step;
a compressing step of compressing each of the plurality of bands of image information in the compression method selected in said selecting step; and
a transmitting step of transmitting each of the plurality of bands of compressed image information to the print control apparatus.

* * * * *